(12) United States Patent
Bosch et al.

(10) Patent No.: US 6,903,285 B2
(45) Date of Patent: Jun. 7, 2005

(54) STEERING COLUMN SWITCH

(75) Inventors: Juergen Bosch, Donauwoerth (DE); Erhard Brunner, Noerdlingen-Loepsingen (DE); Martin Kleinle, Wolferstadt (DE); Karl Simonis, Illingen (DE); Rainer Lipfert, Heilbronn (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 10/702,584

(22) Filed: Nov. 7, 2003

(65) Prior Publication Data
US 2004/0094395 A1 May 20, 2004

(30) Foreign Application Priority Data

Nov. 12, 2002 (DE) ........................................ 102 52 378

(51) Int. Cl.[7] ........................... H01H 9/00; H01H 25/04
(52) U.S. Cl. ................................................. 200/61.54
(58) Field of Search ......................... 200/61.45–61.57, 200/553–563, 61.27, 61.3, 61.34, 61.35

(56) References Cited

U.S. PATENT DOCUMENTS

| 5,440,085 A | 8/1995 | Suzuki et al. |
| 5,720,385 A | 2/1998 | Uchiyama |
| 5,742,014 A | 4/1998 | Schwartz et al. |
| 5,900,601 A | 5/1999 | Uchiyama |

FOREIGN PATENT DOCUMENTS

| DE | 44 26 556 | 10/1995 |
| DE | 198 01 526 | 7/1998 |
| DE | 199 58 507 | 6/2001 |
| DE | 102 20 881 | 12/2002 |
| EP | 0 768 688 | 4/1997 |
| EP | 0 887 230 | 12/1998 |
| FR | 2 747 834 | 10/1997 |

*Primary Examiner*—James R. Scott
(74) *Attorney, Agent, or Firm*—Paul Vincent

(57) ABSTRACT

A steering column switch for a vehicle has a switch unit whose control lever is pivotably disposed in two transverse pivot planes which are preferably approximately perpendicular to each other and is coupled to switching members having switching contacts such that the switching contacts load the connecting contacts of a strip conductor support (20) in dependence on a working position of the control lever. A region of the control lever facing the switching members has contact points which are tapped by contact elements disposed on the switching member side to provide an electric connection to the strip conductor support. The ends of the contact elements facing the control lever load the contact points approximately at a right angle with respect to the strip conductor support and below a pivot axis of the control lever which extends parallel to the strip conductor support.

16 Claims, 5 Drawing Sheets

STEERING COLUMN SWITCH

This application claims Paris Convention priority of DE 102 52 378.9 filed Nov. 12, 2002 the complete disclosure of which is hereby incorporated by reference.

BACKGROUND OF THE INVENTION

The invention concerns a steering column switch for a vehicle, comprising a switch unit whose control lever is disposed to pivot in two transverse pivot planes which are preferably approximately perpendicular to each other and is coupled to switching members having switching contacts such that the switching contacts load the connecting contacts of at least one strip conductor support in dependence on the working position of the control lever, wherein the region of the control lever facing the switching members has contact points which are tapped by contact elements disposed on the switching member side to provide an electric connection to the strip conductor support.

FR 2747834 A1 discloses a steering column switch with which a switching member is displaced on a single flat strip conductor support into a switching position corresponding to the working position of the control lever. When the control lever is pivoted about an axis which is perpendicular to the strip conductor support, the switching member is also pivoted about this axis relative to the strip conductor support.

When the switching member is pivoted about an axis which extends parallel to the strip conductor support, the switching member is linearly guided over the strip conductor support via a deflecting mechanism. This prior art is disadvantageous in that a relatively large amount of space is required. In particular, the surface of the strip conductor support must be particularly large to ensure that the switching contacts of the switching member can contact the corresponding connecting contacts of the strip conductor support in all working positions of the control lever.

DE 199 58 507 A1 discloses a steering column switch of this type having two flat strip conductor supports which are disposed at right angles with respect to each other. When the control lever is pivoted in one pivot plane, a switching element contacts the connecting contacts of one strip conductor support and when the control lever is pivoted in the other pivot plane, the connecting contacts of the other strip conductor support are loaded. The use of two strip conductor supports which are disposed at right angles to each other requires additional space and additional components.

The end of this conventional control lever facing the switching members has contact points which are tapped by contact elements. Switch units disposed at the free end of the control lever can be provided with current via the contact points or contact elements. The contact elements establish electric contact with the strip conductor support. Legs bias the contact elements against the contact points, the legs being guided in slots which follow and compensate for the pivoting motion of the control lever. Guidance of the legs in this fashion requires additional components and associated increased space.

It is therefore the underlying purpose of the present invention to further develop a steering column switch as disclosed e.g. in DE 199 58 507 A1 in such a fashion as to preferably save space, while facilitating contact of the contact points and arrangement of the contact elements.

SUMMARY OF THE INVENTION

This object is achieved with a steering column switch which is characterized in that the ends of the contact elements facing the control lever load the contact points approximately at a right angle with respect to the strip conductor support and approximately below the pivot axis of the control lever, wherein that pivot axis extends parallel to the strip conductor support. Advantageously, the position of the free ends of the contact elements abutting the contact points of the control lever thereby changes only slightly when the control lever is pivoted about the axis extending parallel to the strip conductor support. The distance through which the ends of the contact springs must move during pivoting of the control lever is very short. The resilient loading of the contact elements can consequently be designed such that only this short distance must be compensated for. The conventional demanding guidance of the contact elements can thereby be avoided.

The ends of the contact elements in electrical communication with the strip conductor support are advantageously disposed at a right angle with respect to the strip conductor support and below the pivot axis of the control lever. Advantageously, the contact elements may thereby be very small and space-saving. They may be largely symmetrical since the plane defined by the ends facing the control lever and the ends of the contact elements facing the strip conductor support extends largely perpendicular to the strip conductor support.

In one further preferred embodiment of the invention, the contact elements are disposed on a rotary switching member which is rotatably disposed about an axis of rotation which extends perpendicular to the strip conductor support such that the ends of the contact elements facing the strip conductor support are in the region of the axis of rotation of the rotary switching member. The connection contacts are consequently centrally disposed. Advantageously, the ends of the contact elements facing the strip conductor support thereby travel a minimum distance on the strip conductor support when the control lever is pivoted about the pivot axis which extends perpendicular to the strip conductor support. The connecting contacts for the ends of the contact elements facing the strip conductor support can thereby be kept very small and the size of the strip conductor support can be reduced. It is thereby advantageous to eccentrically dispose the rotary switching member.

One embodiment of the invention provides that the contact elements are stationary relative to the pivoting motion of the control lever about the pivot axis, wherein the ends of the contact elements facing the control lever follow the pivoting motion of the contact points under resilient prestress, thereby loading them. The contact elements are thereby preferably mounted to the rotary switching member.

In a further embodiment of the invention, the strip conductor support has connecting contacts on its upper and lower sides, which are correspondingly contacted depending on the working position of the control lever. This is advantageous in that, in contrast to prior art, not only one side of the strip conductor support is used for contacting the switching contacts of the switching members but both the upper and lower sides of the strip conductor support have connecting contacts for the switching contacts of the switching members. The region of the strip conductor support which is relevant for the corresponding switch unit can thereby be substantially reduced in size. The associated steering column switch is therefore more compact.

The strip conductor support with connecting contacts can be designed as a printed circuit board, a conducting sheet, pressed screen or the like. Depending on the type of steering column switch, the strip conductor support may extend largely perpendicular to the steering column axis.

An advantageous steering column switch is obtained when the connecting contacts which are relevant for motion of the control lever in one pivot plane are disposed on either the upper or lower side of the strip conductor support with the connecting contacts which are relevant for motion of the control lever in the other pivot plane being disposed on the other side of the strip conductor support. It is thereby advantageous if the connecting contacts which are loaded when the actuating lever is pivoted parallel to the strip conductor are on the upper side, i.e. on the side of the strip conductor support facing the control lever with the connecting contacts which are loaded when the control lever is pivoted perpendicular to the strip conductor support being disposed on the lower side of the strip conductor support.

The switching member may be advantageously designed as a sliding switching member which is coupled to the control lever via a deflecting mechanism such that motion of the control lever in the other pivot plane which preferably extends perpendicular to the strip conductor support, disposes the sliding element on the strip conductor support such that it can be displaced in a linear fashion. The sliding element is advantageously disposed on the lower side of the strip conductor support i.e. on the side of the strip conductor support facing away from the control lever.

In an advantageous steering column switch, a rotary switching member is provided on the upper side of the strip conductor support and the sliding switching member is provided on the lower side of the strip conductor support. Depending on the actuating direction of the control lever, the rotary switching member and/or the sliding switching member is actuated.

The deflecting mechanism preferably has a foot part communicating with the free end of the control lever which can be pivoted about an axis disposed parallel to the strip conductor support and with a deflecting member which is formed in one piece with the foot part or which is motionally coupled thereto and is coupled to the sliding switching member. The control lever may be connected to the foot part in a detachable or undetachable fashion or be can integral therewith.

The control lever may thereby be premounted as individual assembly and be inserted into the foot part only during final mounting. This provides flexible and inexpensive mounting of the steering column switch.

The foot part and/or deflecting member are preferably disposed on the rotary switching part to be pivotable about an axis which extends parallel to the strip conductor support. It is feasible to dispose the foot part and also the deflecting member to each be pivotable about its own axis, wherein the two axes extend parallel to each other and parallel to the strip conductor support.

The motional coupling between the foot part and the deflecting member may thereby be a transmission coupling. The transmission coupling can be realized e.g. by a lever coupling, frictional coupling or gearing between the foot part and the deflecting member. The transmission coupling preferably produces a gear reduction, wherein a small pivoting motion of the control lever is reduced to a larger pivoting motion of the deflecting member. This contributes to greater adjustment distances of the corresponding switching member on the corresponding side of the strip conductor support.

The deflecting member preferably engages behind, around or through the strip conductor support, wherein the sliding switching member is disposed on the side of the strip conductor support opposite to the rotary switching member.

The strip conductor support may have an opening for penetration of the deflecting member through the strip conductor support. The opening is preferably designed such that the deflecting member does not contact the strip conductor support when the control lever is pivoted.

A further particularly preferred embodiment of the invention is characterized in that the foot part is formed as a component which is separate from the control lever.

The rotary switching member advantageously has switching contacts in the region remote from its axis of rotation. Due to the relatively large separation from the axis of rotation, these switching contacts travel a relatively large distance when the rotary switching member is pivoted about its axis. The switching contacts can load different connecting contacts disposed on the strip conductor support depending on the position of the control lever or the rotary switching member.

Further advantages and advantageous details of the invention can be extracted from the following description wherein the invention is described and explained in more detail with reference to the embodiment shown in the drawing.

DESCRIPTION OF THE PREFERRED EMBODIMENT

Figure 1:
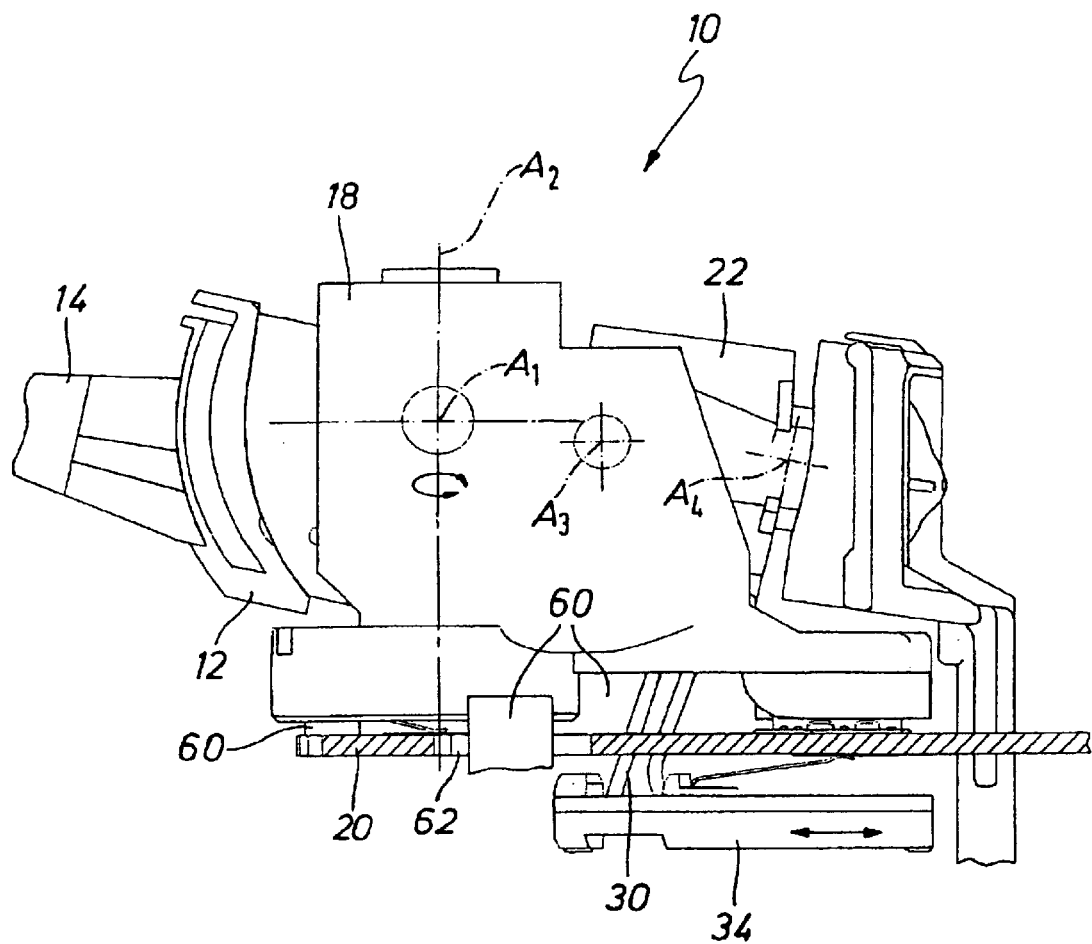
FIG. 1 shows a side view of a switch unit of an inventive steering column switch.
Figure 2:
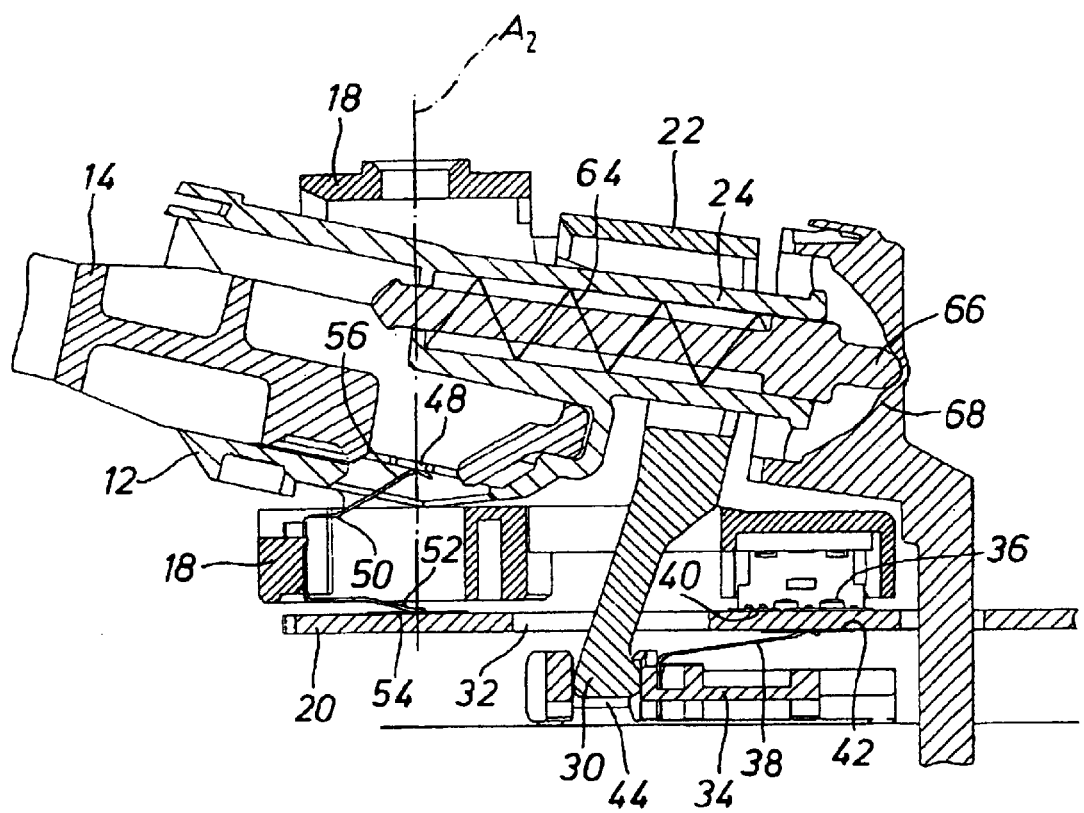
FIG. 2 shows a longitudinal section through the switch unit of FIG. 1.

The switch unit 10 of a steering column switch shown in the figures comprises a foot part 12 accommodating a control lever 14, a portion of which is shown in FIGS. 1 and 2. The control lever 14 is disposed to pivot in two pivot planes $E_1$ and $E_2$ which extend transversely, approximately perpendicularly to each other. The $E_1$ plane lies in the plane of FIG. 2 and the $E_2$ plane extends perpendicular to the plane of FIG. 2. The control lever 14 is thereby disposed to be pivotable about the axis $A_1$ in plane $E_1$ and about the axis $A_2$ in plane $E_2$. In the embodiment of the invention shown, the control lever 14 is designed to be lockable with the foot part 12. In accordance with the invention, the control lever 14 may be integral with the foot part 12.

The foot part 12 is disposed on a rotary switching member 18 via bearing pins to be pivotable about the axis $A_1$. The rotary switching member 18 is disposed on a strip conductor support 20 to be pivotable about the axis $A_2$.

A deflecting member 22 is also disposed on the rotary switching member 18 to be pivotable about an axis $A_3$, which is parallel to the axis $A_1$. The deflecting member 22 is thereby motionally coupled to the foot part 12 via a transmission coupling. When the control lever 14 or foot part 12 is pivoted about the axis $A_1$, the deflecting member 22 is pivoted about the axis $A_3$ with a predetermined gear transmission ratio. The gear transmission ratio is thereby selected such that a small motion of the control lever 14 produces a large motion of the deflecting member 22.

To realize the gear transmission ratio, the foot part 12 has a lever section 24 which largely penetrates through the deflecting part 22 and has two gear pins 26 which extend parallel to the axes $A_1$ and $A_3$. The gear pins 26 project into two opposite receiving grooves 28 provided on the inner side of the deflecting part 22. In the mounted state, the gear pins 26 are located in the receiving grooves 28, preferably largely without play, wherein the gear pins 26 are disposed in the receiving grooves 28 on the side of the deflecting member 22 facing away from the axis $A_3$. FIG. 1 indicates the axis of the gear pins 26 using reference numeral $A_4$. The axes $A_1$, $A_3$ and $A_4$ are disposed parallel to the strip conductor support 20 and the axis $A_2$ extends perpendicular to the strip conductor support 20. Depending on the embodiment of the switch unit 10, the foot part 12 and the deflecting part 22 may also be integral, without gear transmission. Providing a gear transmission as shown in the figures and described above, is advantageous in that a deflecting lever 30 provided on the deflecting member 22 travels a correspondingly long switching path about the axis $A_1$ when the control lever 14 is pivoted. The deflecting lever 30 of the deflecting member 22 penetrates through a recess 32 of the strip conductor support 20 and is coupled to a sliding switching member 34 which is disposed for linear displacement.

The rotary switching member 18 and the sliding switching member 34 have respective switching contacts 36 and 38 which abut in the form of prestressed sliding contacts on the respective connecting contacts 40 and 42 provided on the strip conductor support 20.

As is shown in particular in FIGS. 1 and 2, the flat strip conductor support 20 has connecting contacts 40 on its upper side facing the rotary switching member 18 and the control lever 14 and connecting contacts 42 on its lower side facing the sliding switching member 34. The connecting contacts 40 which are relevant for pivoting the control lever 14 about the axis $A_2$ are disposed on the upper side of the strip conductor support 20. The connecting contacts 42 which are relevant for pivoting the control lever 14 about the axis $A_1$ are disposed on the lower side of the strip conductor support 20. Due to the fact that the strip conductor support has connecting contacts 40, 42 on its upper side and lower side respectively, the strip conductor support 20 may be very small and little space is required for the connecting contacts 40, 42. In one embodiment of the invention as shown in the figures, the connecting contacts 40 provided on the upper side of the strip conductor support 20 are opposite to the connecting contacts 42 provided on the lower side thereby requiring minimum space for these connecting contacts 40, 42.

The deflecting member 22 is designed such that when the rotary switching member 18 is pivoted about the axis $A_2$, the deflecting lever 30 does not come into contact with the strip conductor support 20. The free end of the deflecting lever 30 is disposed in a receiving groove 44 of the sliding switching member 34 such that pivoting of the deflecting member 22 and the deflecting lever 30 about the axis $A_2$ is possible and the free end of the deflecting lever 30 does not abut the end faces 46 of the receiving groove 44.

Figure 3:
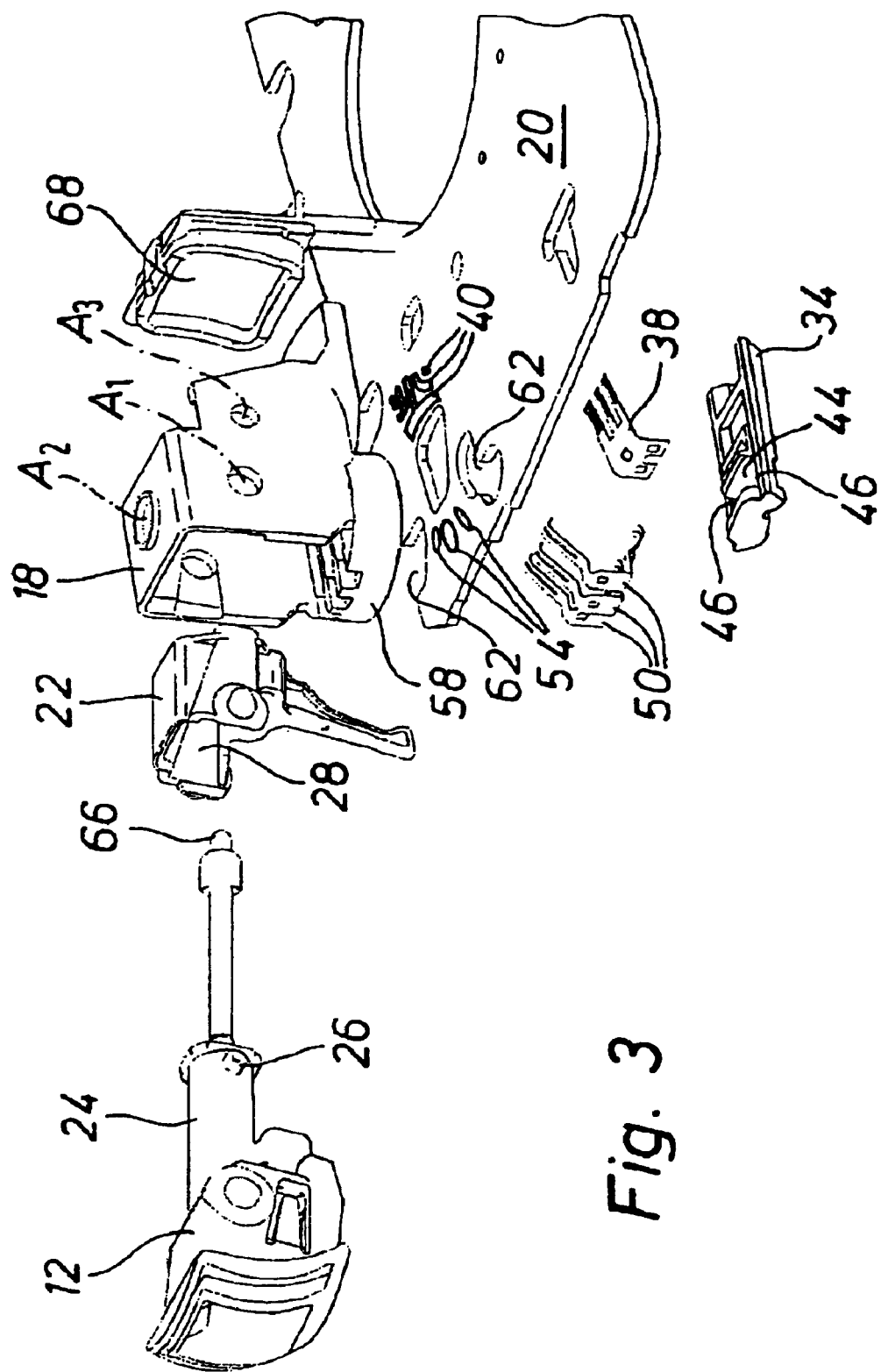
FIG. 3 shows an exploded view of the switch unit of FIGS. 1 and 2.
Figure 4:
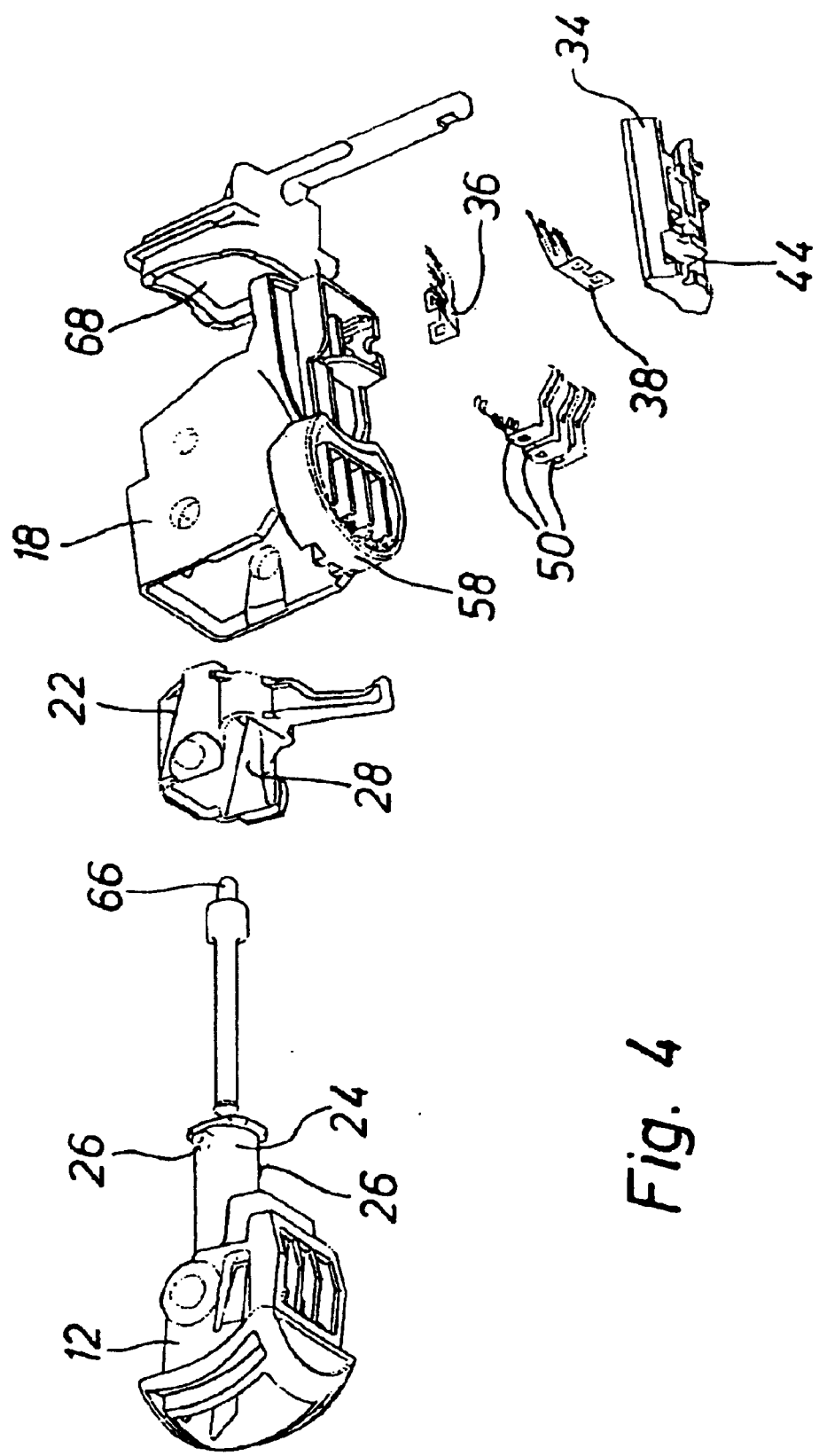
FIG. 4 shows the switch unit of FIG. 3, viewed from below at an angle.
Figure 5:
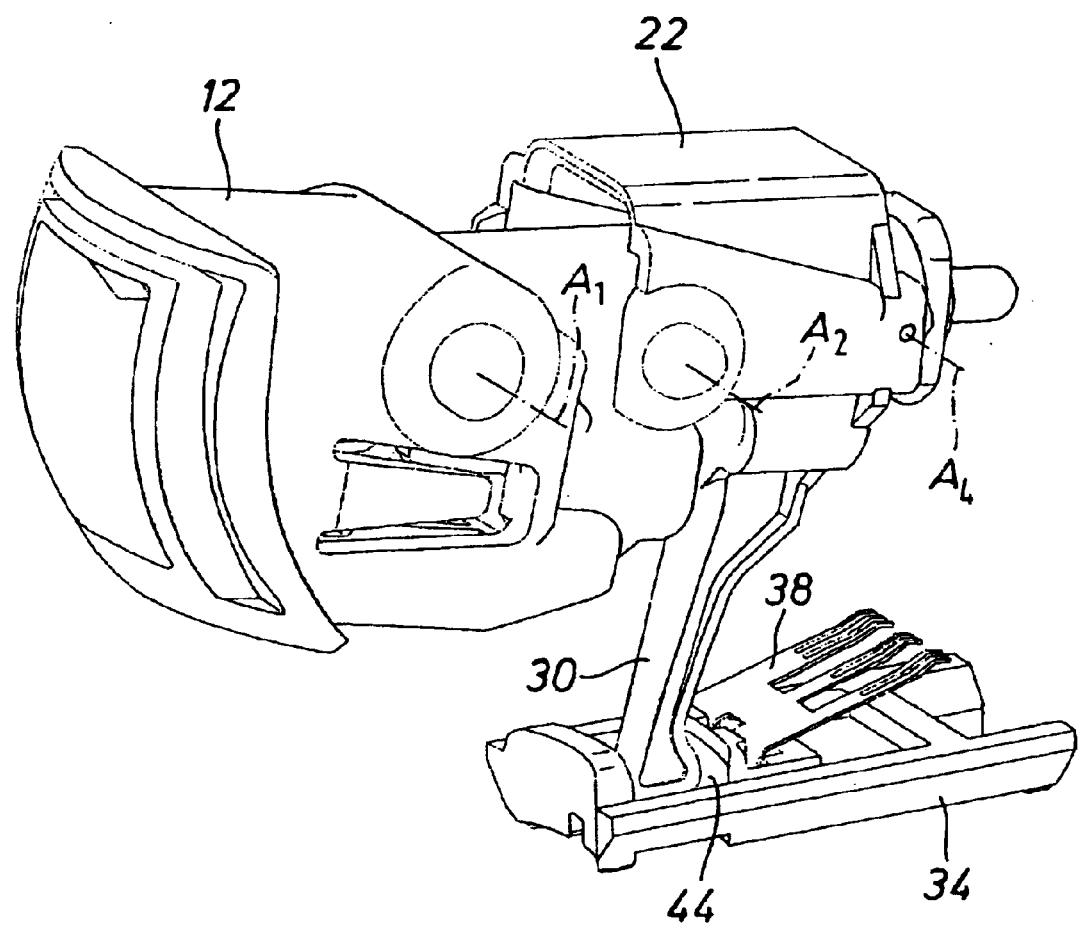
FIG. 5 shows a perspective view of individual parts of the switch unit of FIG. 4.

As seen in FIG. 2, the region of the control lever 14 facing the foot part 12 has contact points 48 which are tapped by contact elements 50 in the form of prestressed spring contacts. Switch units provided at the free end of the control lever 14 are e.g. supplied with current via the contact elements. Advantageously, no switching processes thereby occur at the contact points 48 and 54 when the control lever 14 is actuated. The contact elements 50 are disposed on the rotary switching member 18 and are therefore stationary relative to the pivoting motion of the foot part 12 or the control lever 14 about the axis $A_1$. The ends 52 of the contact elements 50 facing away from the control lever 14 load the contact points 54 of the strip conductor support 20 with resilient prestress. The free ends 56 facing the control lever 14 are disposed perpendicular to the strip conductor support 20, below the pivot axis $A_1$. The ends 52 of the contact elements 50 facing the strip conductor support 20 are disposed perpendicular to the strip conductor support 20 and also below the pivot axis $A_1$. The free ends 52 of the contact elements 50 are also proximate to the axis of rotation $A_2$ of the rotary switching member 18. The rotary switching member 18 is thereby disposed eccentrically. The rotary switching member 18 has an annular section 58 on its side facing the strip conductor support 20 which is held largely without play in its radial position by means of guiding bars 60 disposed on the strip conductor support 20, in particular in the form of annular sections. The guiding bars 60 can thereby be disposed e.g. on the strip conductor support 20 or on a housing section of the steering column switch, which penetrates through the strip conductor support 20. In FIG. 3, the guiding bars 60 penetrate through recesses 62 disposed on the strip conductor support 20.

Since the free ends 56 facing the control lever 14 and the free ends 52 of the contact elements 50 facing the strip conductor support 20 are disposed perpendicular to the strip conductor support 20, below the pivot axis $A_1$, when the control lever 14 is pivoted about the axis $A_1$, only a relatively small motion of the contact points 48 must advantageously be compensated for by the free prestressed ends 56 of the contact points. When the control lever 14 is pivoted about the axis $A_2$, the free ends 52 of the contact elements 50 move only slightly relative to the contact points 54.

The switch contacts 36 which contact different connecting contacts when the control lever 14 is pivoted about the axis $A_2$ in response to the working position of the control lever 14, are remote from the axis $A_2$. The switch contacts 36 therefore travel a relatively large distance when the control lever 14 is pivoted about the axis $A_2$. As mentioned above, the switch contacts 38 of the sliding switching member 34 also travel a relatively large distance when the control lever 14 is pivoted about the axis $A_1$ due to the transmission coupling between the foot part 12 and the deflecting member 22. Depending on the working position of the control lever 14, corresponding connecting contacts 40, 42 are connected to each other via the switching contacts 36, 38.

To keep the control lever 14 in defined predetermined working positions, a cam 66 prestressed by a spring 64 is provided which loads a gear shifting cam 68 on the housing side.

All features described and presented in the description, the drawing and the claims may be essential for the invention either individually or collectively in arbitrary combination.

We claim:

1. A steering column switch for a vehicle the switch comprising:

a housing;

a control lever;

a strip conductor support mounted to said housing;

first pivot means cooperating with said housing and said control lever to pivot said control lever in a first pivot plane about a first axis substantially parallel to said strip conductor support;

second pivot means cooperating with said housing and said control lever to pivot said control lever in a second pivot plane about a second axis transverse to said first axis;

first contact means disposed between said control lever and said strip conductor support to establish electrical contact between said control lever and said strip conductor support, said first contact means having a first end communicating with said control lever and a second end communicating with said strip conductor carrier, wherein said first end is disposed below said first pivot axis to load said control lever at a substantially right angle with respect to said strip conductor support, wherein said second pivot means comprise a rotary switching member disposed to pivot about said second axis, said second axis extending substantially perpendicular to said strip conductor support, wherein said first contact means are mounted to said rotary switching member such that said second end of said first contact means is proximate said second axis of rotation of said rotary switching member.

2. The steering column switch of claim 1, wherein said first plane is substantially perpendicular to said second plane.

3. The steering column switch of claim 1, wherein said second end of said first contact means loads said strip conductor support in an approximately perpendicular direction and is disposed approximately below said first pivot axis of said control lever.

4. The steering column switch of claim 1, wherein said rotary switching member is disposed eccentrically on said strip conductor support.

5. The steering column switch of claim 1, wherein said first contact means are disposed to be substantially stationary relative to a pivoting motion of said control lever about said first pivot axis, wherein said first end of said first contact means facing said control lever follow a pivot motion of contact points on said control lever under resilient prestress loading thereof.

6. The steering column switch of claim 1, wherein said strip conductor support has connecting contacts on both an upper side and a lower side which are contacted in accordance with a working position of said control lever.

7. The steering column switch of claim 6, wherein connecting contacts which are relevant for motion of said control lever in said first pivot plane, are on one side of said strip conductor support and connecting contacts which are relevant for motion of said control lever in said second pivot plane are on an opposite side of said strip conductor support.

8. The steering column switch of claim 1, wherein said rotary switching member has switching contacts in a region remote from said second axis of rotation.

9. The steering column switch of claim 1, further comprising a sliding switching member coupled to said control lever via a deflecting mechanism such that said sliding switching member is disposed on said strip conductor support for linear displacement in response to motion of said control lever in said first pivot plane, said first pivot plane extending substantially perpendicular to said strip conductor support.

10. The steering column switch of claim 9, wherein said deflecting mechanism comprises a foot part which can be pivoted about an axis which is parallel to said strip conductor support and which cooperates with an end of said control lever facing said foot part and a deflecting member which is integral with said foot part or which is motionally coupled therewith, said deflecting member coupled to said sliding switching member.

11. The steering column switch of claim 10, wherein said foot part is a component which is separate from said control lever.

12. The steering column switch of claim 10, wherein a motional coupling between said foot part and said deflecting member is a transmission coupling.

13. The steering column switch of claim 10, wherein said deflecting member engages behind, around, or through said strip conductor support to contact said sliding switching member, said sliding switch member disposed on a side of said strip conductor support facing away from said control lever.

14. The steering column switch of claim 10, wherein at least one of said foot part and said deflecting member is disposed to pivot about a third axis which extends parallel to said Strip conductor support.

15. The steering column switch of claim 14, wherein said third axis is coincident with said first axis.

16. The column switch of claim 14, wherein said third axis is parallel to and displaced from said first axis.

* * * * *